United States Patent [19]

Senanayake

[11] Patent Number: 5,190,024
[45] Date of Patent: Mar. 2, 1993

[54] DIAMOND SAWING PROCESS

[76] Inventor: Daya R. Senanayake, 9 Ecrin Place, Colombo 8,

[21] Appl. No.: 689,793
[22] PCT Filed: Nov. 14, 1989
[86] PCT No.: PCT/LK89/00002
 § 371 Date: Jul. 8, 1991
 § 102(e) Date: Jul. 8, 1991
[87] PCT Pub. No.: WO90/05624
 PCT Pub. Date: May 31, 1990

[30] Foreign Application Priority Data

Nov. 16, 1988 [LK] Sri Lanka .................................. 9954

[51] Int. Cl.$^5$ .............................................. B28D 5/00
[52] U.S. Cl. .............................. 125/30.01; 51/283 R; 63/32
[58] Field of Search ................... 125/30.01; 51/283 R; 63/32

[56] References Cited

U.S. PATENT DOCUMENTS

| | | |
|---|---|---|
| 671,830 | 4/1901 | Loesser . |
| 671,831 | 4/1901 | Loesser . |
| 694,215 | 2/1902 | Stuurman . |
| 732,118 | 6/1903 | Schenck . |
| 732,119 | 6/1903 | Schenck . |
| 3,527,198 | 9/1970 | Takaoka .......................... 125/30.01 |
| 4,392,476 | 7/1983 | Gresser et al. ..................... 125/30.01 |

FOREIGN PATENT DOCUMENTS 122470  1/1919  United Kingdom .

*Primary Examiner*—James G. Smith
*Attorney, Agent, or Firm*—Horst M. Kasper

[57] ABSTRACT

A diamond sawing process, in which guidelines on the outer surface of a rough diamond are used for the sawing of up to six pyramid shapes (340) as fragments from a particular piece of tetrahedron shaped (sawable) diamond, whereby the maximum weight of a polished round brilliant cut (or other round cut diamond) is obtained from a particular rough diamond, together with the fragments. A marking pen or equivalent is held parallel to the center line of the diamond (300), and adjusted so that its point (330) touches the shortest side of the diamond; when the diamond is rotated relative to the point, a circle is marked which represents the maximum round diameter that can be cut for that diamond. The pen crosses the ridges (412, 414, 416, 418) of the diamond, and these crossing points define the starting point of sawing. In a further refinement, the marker pen and its point can also be used to mark the maximum height of the fashioned diamond, these marks being placed on the ridges, and a pyramid shape cut from one or both of the top and bottom (culet) of the rough diamond. Preferably, a laser can be used both to mark and saw the diamond in one operation, thereby saving time and the possible need for readjustment or resetting of the diamond on its fixing.

1 Claim, 3 Drawing Sheets

DIAMOND SAWING PROCESS

This invention relates to a diamond sawing process, and in particular to a diamond sawing process for diamonds which are to be round cut.

Until the fourteenth century, although diamonds were worn in jewellery, they were uncut and worn primarily as amulets. A roughly-fashioned diamond has very little life or sparkle; only when the rough diamond is cut in a sophisticated manner does the life and sparkle become evident.

Cut diamonds appeared in European jewellery, initially as a table cut (FIG. 1), achieved by grinding off the tip (top corner) of a natural octahedron, the octahedron being one of the forms in which diamond crystals occur in nature; the table cut was also extensively used by the ancient Indian lapidaries, who had been faceting diamonds for generations when the European diamond cutters visited them in the seventeenth century.

Another cut employed by medieval lapidaries was the lozenge. This is obtained by grinding away one of the corners on the girdle (widest part) of the octahedron until what is commonly known as a "diamond-shape" is achieved; the result is attractive but a lot of material was wasted, and the cut was therefore not often used.

A popular cut is the "brilliant cut" (FIG. 2 and FIG. 3) in which fifty seven facets (and sometimes an additional culet facet at the bottom tip) are cut from an octahedron; the outline (plan view) of most modern brilliants is circular, but older stones were often "cushion-shaped" (squarish with rounded corners); the brilliant cut revealed for the first time the fire of the diamond i.e. the dispersion of light into the colours of the spectrum, intensified by increasing the length of the path the light travels within the stone, the facets being arranged so that the light is internally reflected from one facet to another so as to travel through as long a path as possible (with total internal reflection) before finally emerging from the stone. With the development of optical science, the cutting of "brilliants" has been improved, and numerous modifications have been introduced over the years to cope both with crystals of different shapes and with very large stones.

Although traditionally referred to as a "cut", usually the facets were ground off and the diamond dust lost. However, Loesser in his 1900 U.S. Pat. No. 671,831 proposed a sawing or cross-cutting process to cut a diamond in two, for the purpose of reducing diamonds to a better size for being worked up into brilliant shape; Loesser proposed removing the top tip (or a corner of the stone just above and parallel to the girdle) as a fragment which could be saved and fashioned into a small brilliant or other form. Loesser states that prior to his invention, in order to produce the flat table formed by the cross-cut, the stone had to be gradually and very slowly ground down, producing powder which flies into the air and is of no commercial value. Another disclosure of a cross-cut to both produce a table cut and a unitary fragment is the 1902 Schenck U.S. Pat. No. 732,119, with a special pre-notching to provide partially-cut facets.

We now propose a diamond cutting process in which a diamond of modified girdle shape, particularly a round cut diamond such as a brilliant, can be fashioned by sawing, with less wastage of material than in the processes of which we are aware.

Thus according to the invention we propose a diamond cutting process for a diamond having a girdle and a plurality of apices, which includes the step of removing an apex as a unitary fragment characterised by starting a cut to one side of the girdle and continuing it through the girdle to the other side of the girdle, whereby the fragment removed is a girdle apex. The process will usually be repeated for the other three girdle apices, but of course whether there are four girdle apices to be removed will depend both upon the shape of the individual crystal and the desired cut. The top and bottom tips can also subsequently be removed. The girdle apex fragments (and top tip and bottom tip fragments) can thereafter all be used for fashioning into small brilliants; whilst each girdle apex fragment cut and removed from the body of the diamond can be a step towards a round or other required cut. A particular feature of our diamond sawing process as taught herein is that the maximum polished weight of a round cut, for example a round brilliant cut, can still be achieved from a particular rough diamond, together with however up to six retained fragments. Only one fixing of the diamond to be cut is required.

The invention will be further described by way of example with reference to the accompanying drawings in which.

Figure 1:
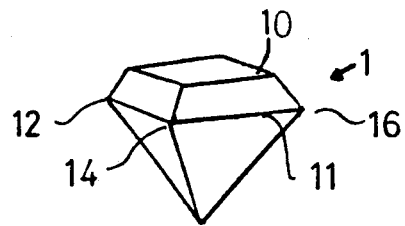
FIG. 1 is a table cut diamond.

FIG. 1 is of a diamond 1 fashioned with table cut. In this embodiment, this cut has been achieved in the traditional manner by grinding off the top tip of a naturally-occurring octahedron. The table 10 in this embodiment is ground parallel to the plane of the girdle 11 (as defined by girdle apices 12, 14, 16, and a fourth girdle apex not seen); but in an alternative embodiment the table can be cross-cut at a slight angle (7 degrees) to the plane of the girdle whereby the table 10 may simultaneously be ground-off and polished. In the embodiment of FIG. 1, following fashioning the girdle apex 14 is spaced equally from girdle apices 12, 16 i.e. the girdle is square in plan view with equal length sides; but in the uncut (rough) diamond the respective pairs of opposed sides were of unequal length so that the octahedron had a rectangular girdle.

Figure 2:
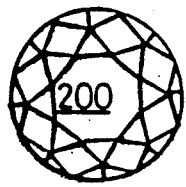
FIG. 2 is a plan view of a brilliant cut diamond.
Figure 3:
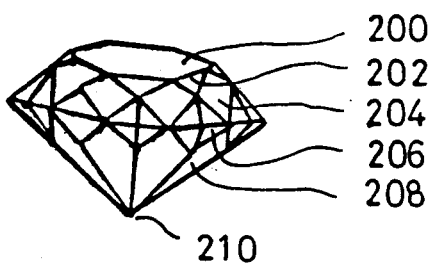
FIG. 3 is a perspective view of a brilliant cut diamond.

FIG. 2 is a plan view of a diamond in which the octahedron girdle has been cut (by grinding) to a circular shape to provide a "round cut" diamond; there has been a considerable loss of material in transforming the rough gemstone to the brilliant form. As seen in FIG. 3 in this embodiment the rough gemstone has been fashioned into a "brilliant cut" diamond with a table facet 200, star facets 202, bezel facets 204, cross facets 206, pavilion facets 208, and a culet or bottom tip 210.

It is noteworthy of this invention that the saw cutting process described below permits the removal of the minimum material so that {a} the maximum weight of a round cut diamond can be achieved from a particular rough diamond; {b} the saw cuts can assist in fashioning the stone towards the desired (round) form; and {c} removed material can itself subsequently be fashioned into valuable jewellery items.

Figure 4:
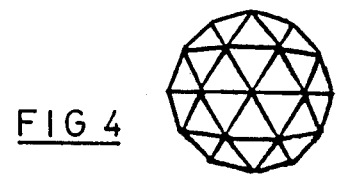
FIG. 4 is a plan view of a rose cut diamond.
Figure 5:
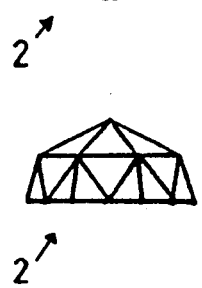
FIG. 5 is a side view of the diamond of FIG. 4.

FIG. 4 and FIG. 5 are of a rose-cut diamond 2; this cut is particularly useful for fashioning small crystal fragments, but is also used for larger stones by manufactures such as Faberge. It will be noted that there is no table facet.

Figure 6:
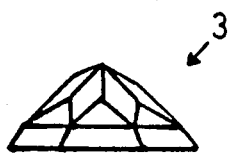
FIG. 6 is a side view of cross rose cut diamond.
Figure 7:
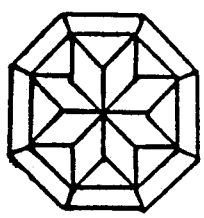
FIG. 7 is a plan view of the diamond of FIG. 6.

FIG. 6 and FIG. 7 are of cross rose 3 with twenty four facets, sixteen of them quadrilateral in shape, and the remaining eight triangular.

Figure 8:
FIG. 8 is a side view of an Antwerp rose cut diamond.
Figure 9:
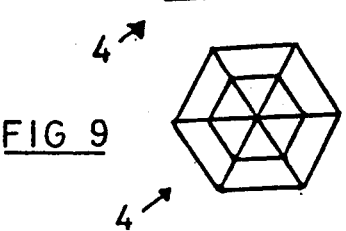
FIG. 9 is a plan view of the diamond of FIG. 8.

FIG. 8 and FIG. 9 are of an Antwerp rose 4, this cut stone being flatter and having only twelve facets.

There are numerous other known cuts, using processes of long-standing but which have in common the need to work the rough gemstone, in accordance with the manufacturer's preference, the customer wishes and the shape of a particular gemstone (taking account of internal flaws needing to be removed).

Figure 10:
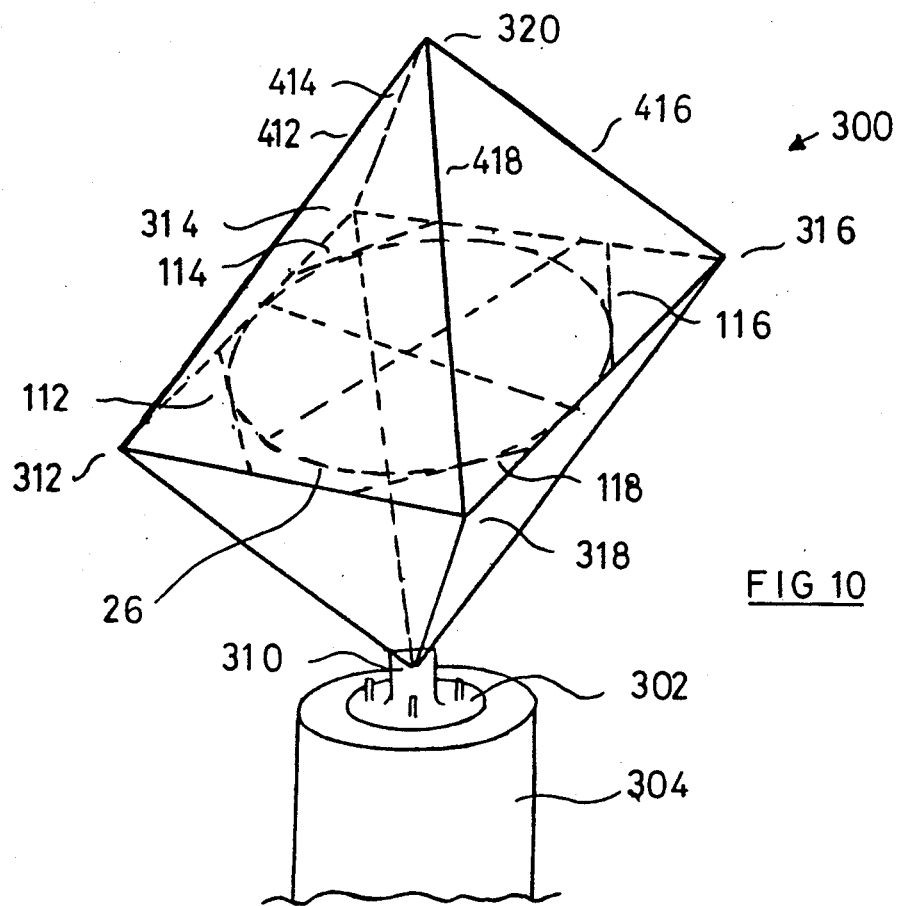
FIG. 10 is of a rough diamond mounted on a movable base plate.

As seen in FIG. 10, in one manner of working the invention the rough tetrahedron diamond 300 is mounted on base plate 302, as by its culet 310 being cemented thereto in known fashion. The base plate 302 is located on rotatable spindle 304 with releasable nuts, or equivalent fixing devices (not shown) such that the base plate 302 can be adjusted in angle and position relative to spindle 304 when the releasable nuts are loosened.

Step one is to determine the narrower sides of the girdle; thus the sides can individually be measured, checked by calipers, a magnified outline can be projected on a screen and a visual check made, or the outline can be projected and the side lengths recorded automatically by an array of photo-electric cells. In FIG. 10 the narrower sides of the diamond are assumed to be that side between girdle apices 312 and 314, and the side opposed thereto between apices 316 and 318. It will be understood that for diamonds with a square girdle the side lengths will be equal.

Step two is to centre the diamond 300 upon spindle 304. The spindle 304 together with the diamond 300 is revolved, and the base plate 302 adjusted so that a vertically-disposed marker, for instance point 330 of pen 329 (FIG. 11), touches the centre points of the shorter sides. The diamond is now centred on the hypothetical perpendicular centre line, which in the FIG. 10 embodiment is at right angles to the plane defined by the girdle apices 312, 314, 316, 318.

It will again be understood that if the girdle sides of the diamond are of equal length, so that the centres of these lines are equidistant from the centre of the diamond, the marking pen point 330 will touch the centre point of each of the sides.

The spindle 304 and thus diamond 300 is now rotated. The line that the marking point 330 describes on the diamond defines the maximum diameter of a round diamond that can be cut from that particular rough diamond. Furthermore, this process also helps define the areas that need to be removed (as a process step towards a round cut diamond).

The dotted lines 112, 114, 116, 118 represent tangents to a hypothetical circle 26, circle 26 being of a diameter which is the maximum diameter of round diamond which can be cut from this rough diamond; thus these dotted lines each represent the cutting line along which the diamond should be sawn i.e. the schematic dotted tangents of FIG. 10 now indicate the cutting lines for the sawing of the four girdle apices 340 (FIG. 13) from the tetrahedron diamond. The angle of cut can be selected for a more valuable fragment e.g. towards either a brilliant or a rose cut (FIG. 2).

It will however be understood that the above mentioned tangents are located internally of diamond 300, so that means are required to mark the sawing guidelines on the external surface of the diamond.

Figure 11:
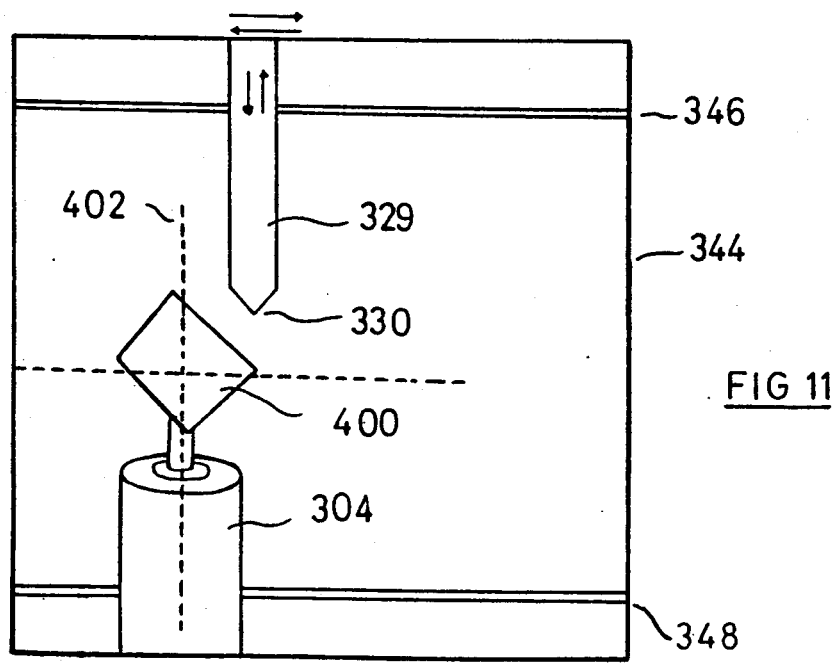
FIG. 11 is a schematic view of the base plate of FIG. 4, together with a marking instrument.

In order that a particular rough diamond 300 can be sawn in accordance with the theoretical guidelines above, one suitable apparatus is shown in FIG. 11. Spindle 304 is fixed to frame 344 so that it can revolve and also move upwards, downwards and sideways, and so can be adjusted to cope with various sizes of rough diamond. In an alternative embodiment the frame can rotate (and rise and fall) and the diamond is held stationary.

A tetrahedron diamond is shown marked 400 (FIG. 11). It is mounted with its central axis or line 402 vertical. The frame 344 has upper parallel bars 346 and lower parallel bars 348. Marking pen 329 is mounted on the upper bars 346 so that it can be adjusted horizontally, and so that as illustrated it can traverse upwards and downwards whilst remaining vertically disposed. In alternative embodiments the pen can be mounted so that it can be held inclined at a selected angle; and more than one pen can be so mounted. The pen 329 is adjusted so that its tip 330 touches the centre point of the two shorter girdle sides, as described above. Spindle 304 is now rotated together with diamond 300; pen point 330 will mark the external surface of the diamond, rising from and dropping to the centre points of the shorter pair of lines, after having risen to cross the intervening ridges 412, 414, 416, 418 (FIG. 10) from top tip or corner 320 to respective girdle apices 312, 314, 316, 318.

The crossing points at each ridge of the line marked by point 330 indicate the cut starting point, the cut being continued through and beyond the girdle plane until a segment 340 (FIG. 13) is removed. In this embodiment the pen 329 is removed and replaced by a sawing device; but in an alternative embodiment the a laser is used instead of a pen so that the decision on the cutting starting point and the cutting itself can be a single operation.

In an alternative embodiment to fashion a different cut, the sawing can be at a different angle to the girdle sides and/or outwardly of the marked ridge position i.e. to fashion or towards fashioning a "cross rose" girdle; rose girdle; and may not be parallel to the spindle axis, for example to fashion or towards fashioning angled facets for a "cross rose" or an "Antwerp rose" girdle.

Figure 12:
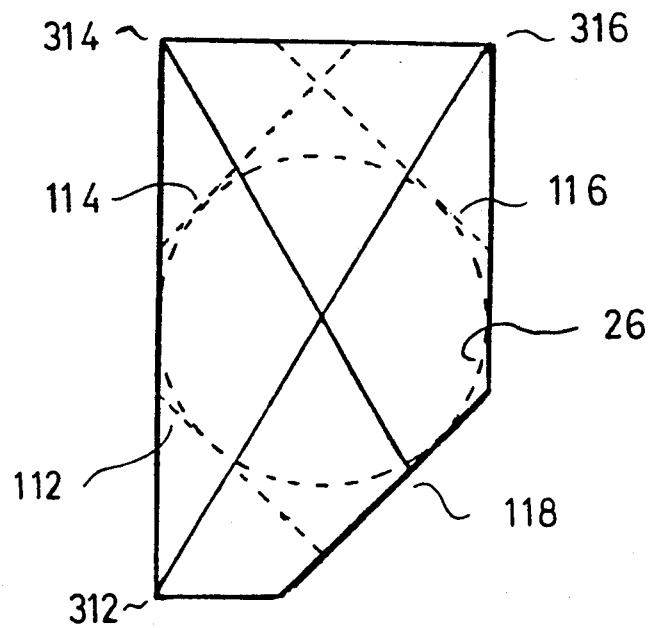
FIG. 12 is a plan view of rough diamond, with one girdle apex removed, according to the invention.
Figure 13:
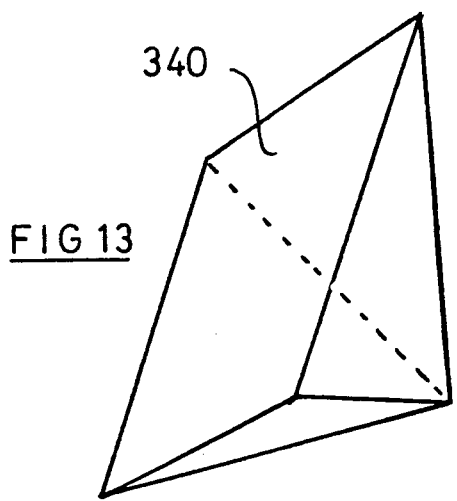
FIG. 13 is a perspective view, enlarged, of the removed girdle apex of FIG. 12.

FIG. 12 is a plan view of an octahedral diamond 400 with one girdle apex removed. FIG. 13 is of a removed girdle apex 340.

Once the four girdle apices have been removed, if the cut so dictates the tip 320 can be removed, as can culet 310. The proportions calculated and published by Tolkowsky include that the table height 200 for the round cut brilliant diamond should be 59.3% of the girdle diameter. Similar height measurements are available or can be calculated for all round diamonds (of the known cuts). Once the required height has been so determined, the marker pen point 330 (or the laser or equivalent) is adjusted, and a cross-cut effected either directly with the laser or after the diamond has been rotated and its surface (ridges) marked.

Depending upon the shape of the rough stone, and the cut to be achieved and thus whether there is a need to saw off both tip 320 and culet 310, up to six pyramid shapes or corner fragments (including four girdle apices) can be retained, with minimum waste and without interfering with the maximum diameter (and required height) for the round diamond that can theoretically be cut from a particular rough tetrahedral sawable diamond. Alternatively stated, there is insignificant loss in weight of diamond material in obtaining the theoretical round diamond of a brilliant cut (or any other round cut) that can be produced from a particular rough tetrahedron sawable diamond; simultaneously, up to six pyramid shaped diamonds are sawn from the same piece of rough tetrahedron diamond, and retained for other uses. The cutting of the girdle apices is a significant stage towards providing a round girdle; which in turn permits an accurate height of table or culet for maximum internal reflection and fire, so enhancing the value of the cut diamond.

I claim:

1. A diamond sawing process for a diamond (300) having an apex portion (310, 320) which defines a girdle and a plurality of girdle apices (312, 314, 316, 318), which includes the step of removing an apex portion (320) of the diamond, the said apex portion being removed as a unitary fragment characterized by starting a cut to one side of the girdle, and continuing the cut through the girdle to the other side of the girdle, whereby to remove a girdle apex (312, 314, 316, 318, 340), also as a unitary fragment, characterized by a diamond having at least two adjacent ridges (412, 414, 416, 418), and by marking means adapted to mark the ridges at positions spaced from the associated girdle apices (312, 314, 316, 318), said mark being made on the diamond external surface and without removal of diamond material, and characterized by means to rotate the diamond relative to said marking means, the marker means having a marker point (330), the marker means being mounted with a vertical travel facility so that the marker point (330) can remain in contact with the diamond external surface.

* * * * *